April 25, 1967      E. PASQUINI      3,315,752
FLEXIBLE STEEL BAND SOD CUTTER
Filed Oct. 15, 1964
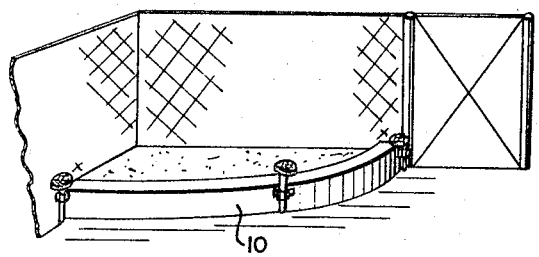
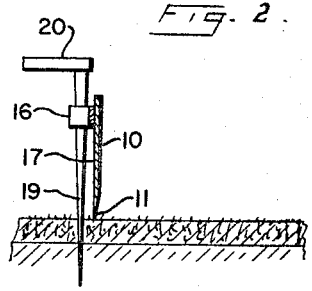
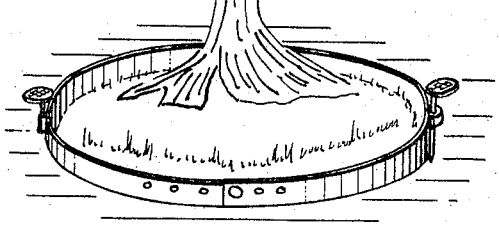
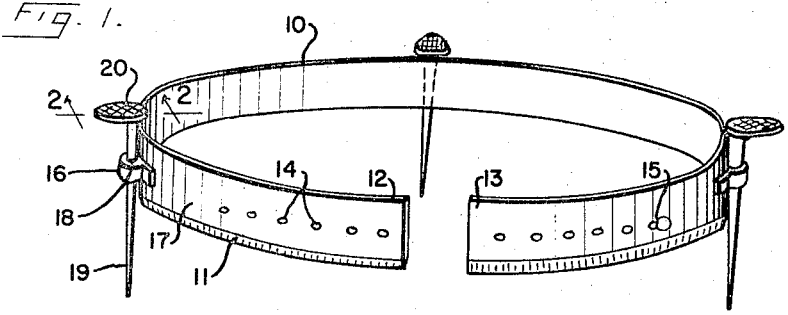
INVENTOR.
ELBRANDO PASQUINI
BY *Howard J. Jeandron*
AGENT United States Patent Office 3,315,752
Patented Apr. 25, 1967

3,315,752
FLEXIBLE STEEL BAND SOD CUTTER
Elbrando Pasquini, 538 Almena Ave.,
Ardsley, N.Y. 10502
Filed Oct. 15, 1964, Ser. No. 404,129
2 Claims. (Cl. 172—19)

This invention relates to sod cutters and more particularly to an elongated flexible steel band with a cutting face for cutting the edge of sod particularly along the side of a walk or driveway to provide a neat clean trimming.

The presently known sod cutters are primarily a hand tool for either cutting a small portion at a time or that are provided with a rolling cutter so that the cutter may be moved along the edge to be cut. There are also sod cutters formed as a straight edge permitting a cutter to be moved along the straight edge for a very exact straight cut. However all of the previous sod cutters are classified as hand tools that require careful control or a degree of dexterity.

It is an object of this invention to provide a sod cutter that is flexible and easily formed into a desired configuration along the edge of a walk or driveway and simply depressed in a desired position to provide an exact cut.

A further object of this invention is to provide an elongated flexible sod cutter that is provided with a plurality of anchoring stakes that may be positioned or depressed into position by foot pressure.

A still further object of this invention is to provide an elongated flexible band having a cutting edge and in which a plurality of apertures are provided in each end so that the two ends of the band may be affixed together at a desired point so that the diameter of the band may be varied as desired to provide a circular or elliptical cut of a predetermined size.

A still further object of this invention is to provide an elongated flexible band having a cutting edge in which the band may be flexed to any particular curved configuration to provide a clean cut of the sod in that configuration.

Other objects of this invention shall be apparent by reference to the accompanying detailed description and the drawings in which FIG. 1 is a perspective illustration of the sod cutter, FIG. 2 is a side elevational view taken on line 2—2 of FIG. 1, FIG. 3 is a perspective pictorial illustration of the device, and FIG. 4 is a perspective illustration of a further configuration formed by the device.

Referring to the drawings there is illustrated an elongated flexible band 10 preferably formed of steel so that a cutting edge 11 may be provided on one edge of the band. Each end 12 and 13 of the band 10 is provided with a plurality of spaced apertures 14 and a nut and bolt 15 is provided so that the band may be affixed together by both ends and the band may be adjusted to reduce or enlarge the circular or ellipical form. To assist in the use of the band cutter, the band is provided with a plurality of fixtures 16 attached to the outer face 17 of the band 10. The fixtures 16 may be bolted or welded to band 10. Each fixture 16 is provided with an aperture 18 parallel to the face 17 of the band. A spike 19 may be positioned in the aperture 18 as illustrated in FIG. 1. Spike 19 is provided with a large flat top 20 formed in the shape of a pedal to permit sufficient area to permit the pressure of a foot to insert spike 19 into the ground in use and thus apply sufficient pressure through fixture 16 to blade 10 to force the cutting edge downward through the sod to provide a cutting operation. The spike 19 is elongated so that as the spike 19 enters the ground it maintains a guided force preventing the blade 10 from moving from its intended cutting path.

Referring to FIG. 2 it is apparent that spike 19 will guide blade 10 directly through a sod in its cutting operation as spike 19 is pressed into the ground. Thus the sod cutter may also be formed into a desired shape approaching a rectangle and the cutter may be used to cut a plurality of sods where sod is being formed and cut and sold for sodding other areas.

Referring to FIG. 3 there is illustrated a further use or embodiment of the sod cutter illustrated in FIG. 1. In the embodiment shown in FIG. 3 the sod cutter is formed with its ends affixed so that it is a circular form surrounding a plant such as a tree. In this embodiment the cutter is partially depressed into the sod and remains in this position to provide a barrier for the movement of parasites that move from the ground to the tree in the spring of the year. This also provides a circular barrier to permit cultivation to the ground outside the barrier without harm to the plant remaining within the barrier. Although band 10 has been shown as a single band, it is to be understood that two or more bands may be joined to form a larger circular barrier.

Referring to FIG. 4 there is illustrated a still further embodiment of the sod cutter illustrated in FIG. 1. In this particular embodiment shown in FIG. 4 the blade 10 is positioned to retain a raised garden area 25 in one corner of a fenced-in area. The blade 10 is not a cutter in this instance but is a form that retains the earth of the garden area to prevent it from spilling upon the walk area 26. It is to be noted that although a single blade 10 is illustrated in FIG. 4, two or more blades may be joined utilizing apertures 14 in the ends 12 and 13 of the blade 10. Two or more blades may be joined to increase the length of blade 10 to cover any desired length of retainer form as shown in FIG. 4. A still further embodiment in the use of blade 10 is illustrated in FIG. 4, that is, a second blade 10 may be positioned along the line XX to provide a pair of forms for pouring a concrete retaining wall for a garden. In this instance, when the concrete has set, the blades 10 may be removed as the flexible forms for the concrete.

The sod cutter illustrated may have its ends joined and thus form a circular cutter or the circular band may be bent into an elliptical form as already described or the band may be joined to a second band to form a larger circular cutter and the band may be bent to approximate a figure 8 configuration or any variation of the configuration as desired. This permits the band to be used as illustrated in FIG. 3 and to be deformed around any obstructions such as a rock. It is also apparent that the band may be formed into other shapes such as a triangle or into various polygon shapes. It is also apparent, referring to FIG. 4, that the band may be utilized as a form and may be formed into any desired straight or curved configuration without departing from the spirit of this invention and this invention shall be limited only by the appended claims.

What is claimed is:

1. A sod cutting tool which includes an elongated flexible metal band provided with a cutting edge for cutting turf along the entire length of said band, said band provided with a plurality of apertures that are positioned in spaced relation longitudinally of the band at each end of the band and bolts to affix two ends together with a pair of apertures in alignment, said band provided on its face with guiding spikes affixed thereto, said spikes provided with enlarged pedal shaped heads.

2. In a device according to claim 1 in which there are a plurality of flexible bands, means to form said cutter into an elipse and means to adjust the overall length of said joined bands.

(References on following page)

References Cited by the Examiner

UNITED STATES PATENTS

| | | | |
|---|---|---|---|
| 2,094,519 | 9/1937 | Ballard | 47—33 |
| 2,184,904 | 12/1939 | Boehme | 47—33 |
| 2,662,342 | 12/1953 | Peterson | 47—33 |

FOREIGN PATENTS

| | | |
|---|---|---|
| 14,174 | 6/1911 | Great Britain. |
| 320,004 | 10/1929 | Great Britain. |
| 234,732 | 10/1944 | Switzerland. |

ABRAHAM G. STONE, *Primary Examiner.*

J. R. OAKS, *Assistant Examiner.*